United States Patent
Lai et al.

(10) Patent No.: US 9,387,465 B2
(45) Date of Patent: Jul. 12, 2016

(54) PROCESS FOR PRODUCING MOLECULAR SIEVE MATERIALS

(75) Inventors: Wenyih Frank Lai, Bridgewater, NJ (US); Robert Ellis Kay, Easton, PA (US); Stephen J. McCarthy, Center Valley, PA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 260 days.

(21) Appl. No.: 14/009,570

(22) PCT Filed: Mar. 12, 2012

(86) PCT No.: PCT/US2012/028818
§ 371 (c)(1),
(2), (4) Date: Oct. 3, 2013

(87) PCT Pub. No.: WO2012/141833
PCT Pub. Date: Oct. 18, 2012

(65) Prior Publication Data
US 2014/0024523 A1  Jan. 23, 2014

Related U.S. Application Data

(60) Provisional application No. 61/475,688, filed on Apr. 15, 2011.

(30) Foreign Application Priority Data

Jun. 24, 2011 (EP) .................................. 11171342

(51) Int. Cl.
*B01J 29/40* (2006.01)
*C01B 39/04* (2006.01)
(Continued)

(52) U.S. Cl.
CPC ............... *B01J 29/041* (2013.01); *B01J 29/00* (2013.01); *B01J 29/0308* (2013.01); *B01J 29/40* (2013.01);
(Continued)

(58) Field of Classification Search
CPC ...... C01B 39/026; C01B 39/38; C01B 39/04; C01B 39/40; C01B 39/48; B01J 29/00; B01J 29/40; B01J 2229/10; B01J 2229/42; B01J 29/041; B01J 29/0308; B01J 37/00; B01J 37/04; B01J 37/041; B01J 37/08; B01J 37/0009; B01J 37/0045
See application file for complete search history.

(56) References Cited

U.S. PATENT DOCUMENTS 4,275,047 A   6/1981   Whittam
4,804,800 A   2/1989   Bortinger et al.
(Continued)

FOREIGN PATENT DOCUMENTS

CN   101 205 071   6/2008
GB   1598042       9/1981
(Continued)

OTHER PUBLICATIONS

Paul et al, Handbook of Industrial Mixing: Science and Practice, vol. 1, pp. 969-972 (2004).*

(Continued)

*Primary Examiner* — David M Brunsman
(74) *Attorney, Agent, or Firm* — Darryl M. Tyus

(57) ABSTRACT

In a process for producing a molecular sieve material, water, at least one source of an oxide of a tetravalent and/or a trivalent element and at least one structure directing agent are mixed in a plough shear mixer/dryer/reactor equipped with a mixer having a Froude number of at least 1, to produce a molecular sieve synthesis mixture having a solids content of at least about 20 wt %. The molecular sieve synthesis mixture is heated in said reactor while agitating said mixture with said mixer to form crystals of said molecular sieve material and said molecular sieve crystals are subsequently recovered from said reactor.

15 Claims, 4 Drawing Sheets

(51) Int. Cl.
- *B01J 29/04* (2006.01)
- *C01B 39/02* (2006.01)
- *B01J 29/03* (2006.01)
- *B01J 37/00* (2006.01)
- *B01J 37/04* (2006.01)
- *B01J 37/08* (2006.01)
- *B01J 29/00* (2006.01)
- *C01B 39/40* (2006.01)
- *C01B 39/48* (2006.01)

(52) U.S. Cl.
CPC .............. *B01J 37/00* (2013.01); *B01J 37/0009* (2013.01); *B01J 37/0045* (2013.01); *B01J 37/04* (2013.01); *B01J 37/08* (2013.01); *C01B 39/026* (2013.01); *C01B 39/04* (2013.01); *C01B 39/40* (2013.01); *C01B 39/48* (2013.01); *B01J 2229/10* (2013.01); *B01J 2229/42* (2013.01)

(56) References Cited

U.S. PATENT DOCUMENTS

| | | | |
|---|---|---|---|
| 5,558,851 A * | 9/1996 | Miller | B01J 29/035 423/702 |
| 6,099,820 A | 8/2000 | Miller | |
| 6,521,585 B1 * | 2/2003 | Yamashita | C11D 17/065 264/117 |
| 6,664,352 B1 * | 12/2003 | Fredriksen | C08F 10/00 502/152 |
| 7,141,232 B2 * | 11/2006 | Miller | C01B 37/02 423/709 |
| 7,572,749 B2 | 8/2009 | Beeckman et al. | |
| 2003/0003035 A1 | 1/2003 | Stamires et al. | |
| 2005/0063901 A1 * | 3/2005 | Miller | C01B 37/02 423/709 |
| 2007/0059237 A1 | 3/2007 | Miller | |

FOREIGN PATENT DOCUMENTS

| | | |
|---|---|---|
| JP | 2007-516930 A | 6/2007 |
| JP | 2008-162238 A | 7/2008 |
| WO | WO 2005/066068 | 7/2005 |
| WO | WO 2007/094950 | 8/2007 |
| WO | WO 2009/055215 | 4/2009 |

OTHER PUBLICATIONS

Y.S. Ahn et al., "*Characterization of MCM-48 Pellet and Corresponding Catalytic Activity for Friedel-Crafts Alkylation*", Studies in Surface Science and Catalysis, vol. 154, pp. 2893-2898, 2005.

Y.S. Ahn et al., "*Friedel-crafts alkylation over Al-incorporated mesoporous honeycomb*", Studies in Surface Science and Catalysis, vol. 146, pp. 669-672, 2003.

Y.S. Ahn et al., "*29-P-27-Fabrication of honeycomb structures with powder MCM-48 silica*", Studies in Surface Science and Catalysis, vol. 135, p. 318, 2001.

J.S. Beck et al., "*A New Family of Mesoporous Molecular Sieves Prepared with Liquid Crystal Templates*", J. Amer. Chem. Soc., vol. 114, Issue 27, pp. 10834-10843, 1992.

Lok et al., "*The Role of Organic Molecules in Molecular Sieve Synthesis*", Zeolites, vol. 3, pp. 282-291, Oct. 1983.

R. Moriyama et al., "*Large-Scale Synthesis of Artificial Zeolite From Coal Fly Ash with a Small Charge of Alkaline Solution*", Fuel, IPC Science and Technology Press, vol. 84, No. pp. 1455-1461, 2005.

W.H. Meier et al., *Atlas of Zeolite Framework Types*, Elsevier, Fifth Edition, 2001, cover and title page.

J.S. Reed, *Principles of Ceramics Processing*, Second Edition, John Wiley & Sons, Inc., pp. 347-354, 1995.

\* cited by examiner

PROCESS FOR PRODUCING MOLECULAR SIEVE MATERIALS

CROSS-REFERENCE AND RELATED

This application is a National Stage Application of International Application No. PCT/US2012/028818, filed 12 Mar. 2012, and claims the benefit of and priority to U.S. Provisional Application No. 61/475,688, filed Apr. 15, 2011, the contents of which are incorporated by reference in their entireties.

FIELD OF THE INVENTION

This disclosure relates to a process for producing molecular sieve materials.

BACKGROUND OF THE INVENTION

Molecular sieve materials, both natural and synthetic, have been demonstrated to have catalytic properties for various types of hydrocarbon conversion. Examples of molecular sieve materials include zeolites, SAPOs, AlPOs, and mesoporous materials. Typically molecular sieve materials are ordered, porous crystalline compositions having a definite crystalline structure as evidenced by their X-ray diffraction pattern. The pores in crystalline molecular sieve materials may vary in cross sectional dimensions from about 2 Å to about 1000 Å.

One particularly important class of molecular sieve materials are the aluminosilicate zeolites, which are described in "Atlas of Zeolite Framework Types", eds. W. H. Meier, D. H. Olson and Ch. Baerlocher, Elsevier, Fifth Edition, 2001, which is hereby incorporated by reference. Such zeolites generally are generally described as microporous materials in that they have a pore size between about 2 and about 13 Å and are usually sub-divided into large, medium and small pore materials. A large pore zeolite generally has a pore size of at least about 7 Å and includes LTL, VFI, MAZ, FAU, OFF, BEA, and MOR framework type zeolites (IUPAC Commission of Zeolite Nomenclature). Examples of large pore zeolites include mazzite, offretite, zeolite L, VPI-5, zeolite Y, zeolite X, omega, and Beta. An intermediate pore size zeolite generally has a pore size from about 5 Å to less than about 7 Å and includes, for example, MFI, MEL, EUO, MTT, MFS, AEL, AFO, HEU, FER, MWW, and TON framework type zeolites (IUPAC Commission of Zeolite Nomenclature). Examples of intermediate pore size zeolites include ZSM-5, ZSM-11, ZSM-22, MCM-22, silicalite 1, and silicalite 2. A small pore size zeolite has a pore size from about 3 Å to less than about 5.0 Å and includes, for example, CHA, ERI, KFI, LEV, SOD, and LTA framework type zeolites (IUPAC Commission of Zeolite Nomenclature). Examples of small pore zeolites include ZK-4, ZSM-2, SAPO-34, SAPO-35, ZK-14, SAPO-42, ZK-21, ZK-22, ZK-5, ZK-20, zeolite A, chabazite, zeolite T, gmelinite, ALPO-17, and clinoptilolite.

In addition to the microporous zeolites, another class of molecular sieve materials of increasing importance is the mesoporous materials, which typically have a pore diameter within the range of from about 13 Angstroms to about 200 Angstroms. Among this broad class of molecular sieve materials, particular attention has been focused on a family of materials, the M41S materials, which are similar to zeolites in that they have pores of uniform, albeit in the mesoprous range. The M41S family of mesoporous molecular sieves is described in *J. Amer. Chem. Soc.*, 1992, 114, 10834.

Synthetic molecular sieves are often prepared from aqueous reaction mixtures (synthesis mixtures) comprising sources of appropriate oxides. Organic directing agents (also referred to as structure directing agents or templates) may also be included in the synthesis mixture for the purpose of influencing the crystallization of a molecular sieve having the desired structure. The use of such directing agents is discussed in an article by Lok et al., entitled "The Role of Organic Molecules in Molecular Sieve Synthesis" appearing in Zeolites, Vol. 3, October, 1983, pp. 282-291.

After the components of the synthesis mixture are properly mixed with one another, the synthesis mixture is subjected to appropriate crystallization conditions, such as for example in an autoclave. Such conditions usually involve heating of the synthesis mixture to an elevated temperature possibly with stirring, and possibly under pressure. When crystallization of the synthesis mixture is complete, the crystalline product is recovered from the remainder of the synthesis mixture and especially the liquid contents thereof. Such recovery may involve filtering the crystals and washing the crystals to remove the mother liquor and other residual synthesis mixture components. The crystals are then normally dried and subjected to high temperature calcination, e.g., at 540° C., particularly to remove any organic directing agent which may otherwise block the pores of the molecular sieve.

Synthetic molecular sieves are expensive, in part, because their production can generate wastewater streams from crystallization and post-crystallization treatment that contain organic directing agents, e.g., surfactants, which are expensive to remediate. Thus, a need exists for a highly efficient process of manufacturing molecular sieves which reduces both the amount of water used and wastewater produced. This disclosure provides a process of manufacturing molecular sieves from forming mixtures of high solids content, using a reactor having a high intensity mixer. In some cases, the process does not require filtering the reaction mixture after crystallization or washing the molecular sieve product before calcinations. Accordingly, the process combines the advantages of reduced cost, shorter crystallization time and higher yield with the minimization of wastewater generated during the molecular sieve manufacture.

WO 2005/066068 discloses a continuous or semi-continuous process for the hydrothermal manufacture of a microporous or mesoporous composition comprising feeding solid and liquid reagents into a heated reactor zone at a temperature between 200° C. and 500° C. with a residence time less than 24 hours wherein said solid reagents have a weight percent between 45% and 98% of said reagents. In the Examples, the solid and liquid reagents are generally mixed in a mixing device and then transferred to a separate reactor for hydrothermal crystallization.

WO 2009/055215 teaches making M41S materials from mixtures having a high solids content (20% to 50 wt % solids) by a process that allows the M41S product to be recovered without a purification step (filtration and/or washing). Crystallization can be carried out under static or agitated conditions in a conventional autoclave. However, this document does not disclose or suggest the use of a reactor capable of high intensity mixing to carry out molecular sieve crystallization. Moreover, in the Examples, crystallization is conducted without stirring on reaction mixtures which are apparently prepared outside the autoclave.

U.S. Pat. No. 6,664,352 to Fredriksen teaches preparing metallocene catalysts by mixing catalyst and porous particulate support in a mechanically fluidized state with a catalyst material. The process uses a mixer having horizontal axis counter-rotating interlocking mixing paddles where paddles on different but preferably parallel rotational axes pass through a common mixing zone. The mixer can have a Froude number of from 1.05 to 2.2. No suggestion or disclosure is made for using this mixer in the crystallization of molecular sieves.

U.S. Pat. No. 6,521,585 to Yamashita et al. discloses the production of crystalline alkali metal silicate granules which are stably formulated in detergents. Temperature-controllable agitating mixers carry out mixing of the crystalline alkali metal silicate with detergent at a Froude number of 1 to 12 to control particle size distribution of granules. Mixers include horizontal, cylindrical blending vessels having agitating impellers on an agitating shaft.

Various mixers useful to mix slurries, pastes, and plastic bodies are described in "Principles of Ceramics Processing", Second Edition, James S. Reed, John Wiley & Sons, Inc., 1995, pp. 347-354.

SUMMARY OF THE INVENTION

In one aspect, the invention resides in a process for producing a molecular sieve material, said process comprising the steps:

(a) mixing water, at least one source of an oxide of a tetravalent and/or a trivalent element and at least one structure directing agent in a reactor equipped with a mixer having a Froude number of at least 1, to produce a molecular sieve synthesis mixture having a solids content of at least 20 wt %;

(b) heating the molecular sieve synthesis mixture in the reactor while agitating the mixture with said mixer to form crystals of said molecular sieve material; and then (c) recovering the molecular sieve crystals from the reactor.

Conveniently, said mixing produces a synthesis mixture having a solids content of about 20 wt % to about 50 wt %.

In one embodiment, the process further comprises the step:

(d) prior to recovering the molecular sieve crystals from the reactor, removing water from the mixture in said reactor by the application of heat and/or reduced pressure while agitating the mixture with the mixer so as to decrease the water content of mixture inside the reactor by at least 5 wt % and produce a partially dried mixture.

Conveniently, said removing step (d) is conducted after formation of the crystals of said molecular sieve material in step (b).

Conveniently, the process further comprises the step:

(e) mixing said partially dried mixture with an additional particulate material, either in the reactor or in a separate mixer, to produce a product mixture.

Conveniently, said additional particulate material is a catalyst formulation component, such as a binder or matrix material.

Conveniently, the process further comprises extruding said recovered product mixture into a shaped body.

Conveniently, the process further comprises calcining the recovered molecular sieve crystals without subjecting the crystals to an initial filtration and/or washing step.

In one embodiment, the reactor has a capacity of at least 5 liters, such as at least 20 liters, for example at least 200 liters.

In one embodiment, the mixer comprises at least one blade located on a shaft rotatable about an axis oriented at no more than 10° from horizontal.

Conveniently, the molecular sieve material comprises ZSM-5 or MCM-41.

DETAILED DESCRIPTION OF THE EMBODIMENTS

Figure 1:
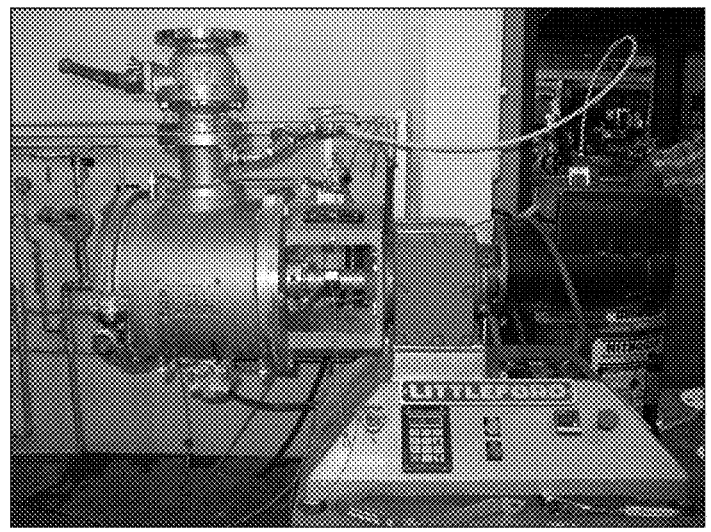
FIGS. 1 and 2 show a 5 gallon commercial pilot-scale horizontal plough shear mixer/dryer/reactor having a top mount charge opening used in the synthesis process of the Examples.

Described herein is a process for producing microporous and mesoporous molecular sieve materials in which an aqueous synthesis mixture having a high solids content of at least 20 wt % is produced and crystallized under agitation in the same reactor equipped with a high-intensity mixer capable of operating at a Froude number of at least 1, such as from 1 to 12, for example from 2 to 10. In this process, the Froude number of an impeller of a high-speed mixer is used as a measure of the resistance of the impeller moving through a fluid medium. In this respect, the Froude number (Fr) of a mixer having an impeller of diameter (d) in meters and rotating at N revolutions per second is defined by the following equation:

$$Fr=N^2 d/g$$

where g is acceleration due to gravity (9.81 m/s$^2$). Conveniently, the reactor employed in the present process is configured so that the impeller of the high-intensity mixer is mounted on a shaft rotatable about an axis oriented at no more than 10° from horizontal. Typically, the reactor has a length to diameter ratio greater than 0.75, for example greater than 1.0, such as greater than 1.5 and a capacity of at least 5 liters, such as at least 20 liters, for example at least 200 liters.

The synthesis mixture used in the present process is produced by adding water, at least one source of an oxide of a tetravalent element (X) and/or a trivalent element (Y), at least one structure directing agent and generally a source of an alkali metal or alkaline earth metal compound M to the reactor. The contents of the reactor are then mixed using the high-intensity mixer until a homogeneous slurry having the desired solids content is produced. Typically, mixing is effected at a temperature of about 20° C. to about 50° C. for a time of about 30 minutes to about 2 hours.

Generally, the synthesis mixture has a solids content of at least 20 wt %, such as from about 20 wt % to about 50 wt %, preferably at least 25 wt %, such as from about 25 wt % to about 45 wt %, and most preferably at least 30 wt %, such as from about 30 wt % to about 40 wt %. As used herein, the term "solids content" is defined as the percentage by weight of the tetravalent and trivalent element oxides to the total weight of the synthesis mixture (excluding any seeds) and is calculated as follows:

$$\text{Solids content} = \frac{\text{weight of oxides in synthesis mixture} \times 100}{\text{Total weight of synthesis mixture}}$$

Typically, the reaction mixture has an apparent viscosity of at least 10$^5$ MPa sec, such as about 10$^6$ to about 10$^9$ MPa sec.

Examples of suitable oxides of tetravalent elements that can be included in the synthesis mixture include oxides of silicon, germanium, and tin, with silicon being preferred. Suitable sources of silicon oxides include colloidal silica, precipitated silica, potassium silicate, sodium silicate, and fumed silica. Preferred sources of silica include those containing at least about 30 wt % solid silica, e.g., silica sold by Evonik Degussa under the trade names Aerosil, Ultrasil or Sipernat (a precipitated, spray dried silica containing about 90 wt % silica) and silica sold under the trade name Ludox (available from Grace Davison), or HiSil (a precipitated hydrated $SiO_2$ containing about 87 wt % silica, available from PPG Industries).

Examples of suitable oxides of trivalent elements that can be included in the synthesis mixture include oxides of aluminum, boron, iron, and/or gallium, especially aluminum. Suitable sources of alumina include hydrated aluminum oxides, such as boehmite, gibbsite, and pseudoboehmite, sodium aluminate and oxygen-containing aluminum salts, such as aluminum nitrate.

The synthesis mixture also includes at least one structure directing agent effective under the crystallization conditions to direct the synthesis of the desired molecular sieve composition. The particular structure directing agent employed, which is normally an organic nitrogen or phosphorus compound, will therefore depend on the target molecular sieve. In one preferred embodiment, where the target molecular sieve is ZSM-5, the directing agent may include an amino acid, such as glutamic acid, a tetrapropylammonium compound, a dimethylethylpropylammonium compound, 1,2-diaminocyclohexane, an ethanoltripropylammonium compound, an alkyldiamines, 1,6-hexanediol, poly(ethylene glycol), triethylene-tetramine and a primary monoalkylamine having 2 to 9 carbon atoms in the alkyl portion, particularly n-propylamine (n-PA). In a further preferred embodiment, where the target molecular sieve is MCM-41, the directing agent may include a quaternary ammonium or phosphonium ion of the formula:

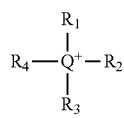

wherein Q is nitrogen or phosphorus and wherein at least one of $R_1$, $R_2$, $R_3$, and/or $R_4$ is aryl or alkyl having from 6 to about 36 carbon atoms, preferably wherein at least one of $R_1$, $R_2$, $R_3$, and/or $R_4$ comprises —$C_6H_{13}$, —$C_{10}H_{21}$, —$C_{16}H_{33}$, —$C_{18}H_{37}$, or combinations comprising at least one of the foregoing. The remainder of $R_1$, $R_2$, $R_3$, and/or $R_4$ preferably comprises hydrogen, alkyl of from 1 to 5 carbon atoms, and combinations comprising at least one of the foregoing. Conveniently, the quaternary ammonium or phosphonium ion is derived from the corresponding hydroxide, halide, or silicate.

The relative amounts of water, tetravalent and/or trivalent element oxide and structure directing agent added to the reactor to form the synthesis mixture will also vary in known manner according to the target molecular sieve. Thus, in said one preferred embodiment, where the target molecular sieve is ZSM-5, the synthesis mixture will typically have the following molar composition, where R designates the organic directing agent:

| Molar Ratio | Broad | Preferred |
|---|---|---|
| OH-/$SiO_2$ | 0.05-0.5 | 0.1-0.3 |
| R/$SiO_2$ | 0.05-1.00 | 0.10-0.30 |

| Molar Ratio | Broad | Preferred |
|---|---|---|
| $H_2O$/$SiO_2$ | 2-30 | 5-15 |
| $SiO_2$/$Al_2O_3$ | 20-500 | 20-150 |
| M/$SiO_2$ | 0.05-0.5 | 0.1-0.3 |

Similarly, in said further preferred embodiment, where the target molecular sieve is MCM-41, the synthesis mixture will typically have the following molar composition, where R again designates the organic directing agent:

| Molar Ratio | Broad | Preferred |
|---|---|---|
| $Al_2O_3$/$SiO_2$ | 0 to 0.5 | 0.001 to 0.05 |
| $H_2O$/$SiO_2$ | 2 to 10 | 4 to 8 |
| OH-/$SiO_2$ | 0 to 10 | 0.05 to 5 |
| $M_{2/e}O$/($SiO_2$ + $Al_2O_3$) | 0 to 5 | 0.005 to 3 |
| $R_2O$/($SiO_2$ + $Al_2O_3$) | 0.01 to 2.0 | 0.03 to 1.0 | where e is the valence of the metal M.

To facilitate crystallization process, the synthesis mixture may contain seeds, typically seeds of the target molecular sieve, in amount sufficient to provide at least 500 ppm, for example at least 1,000 ppm, such as at least 10,000 ppm seeds by weight of the overall synthesis mixture.

When the formation of the synthesis mixture is complete, the temperature of the mixture in the reactor is raised to the desired crystallization temperature, generally in the range of about 80° C. to about 200° C., such as from about 100° C. to about 160° C., and maintained at this temperature for about 6 to about 150 hours, such as about 12 to about 72 hours. During the crystallization process, the synthesis mixture is continuously agitated with the high intensity mixer. In addition, the reactor is normally sealed during the crystallization process so that there is an autogenous rise in pressure in the reactor during the process.

Especially in the synthesis of mesoporous molecular sieves, such as MCM-41, it may be desirable, during or, more preferably, after the crystallization process to remove at least part of the water from the synthesis mixture. Typically, such water is removed by either the application of heat to the mixture or by reducing the pressure in the reactor, while continuing to agitate the mixture with the high intensity mixer. Water removal is generally continued until the water content of the mixture has been decreased by at least 5 wt %, such as by at least 10%, for example from about 10 to about 20 wt %. The excess water is removed prior to recovering the molecular sieve crystals from the reactor. By removing the excess water, the partially dried molecular sieve crystals can be recovered from the reactor and then subjected to calcination to remove the organic directing agent without an initial filtration or washing step.

Alternatively, when crystallization is complete and the mixture in the reactor has been partially dried, it may also be desirable to add an additional particulate material to the reactor and then employ the high intensity mixer to admix the additional particulate material with the crystalline molecular sieve and the mother liquor remaining after the drying process. For example, the additional particulate material could be a catalyst formulation component, such as a binder or matrix material, in which case the product mixture recovered from the reactor after addition of the additional particulate material could be extruded into a shaped catalyst body. After calcination to remove the organic directing agent and, if necessary ammonium exchange/calcination to convert the molecular sieve to the hydrogen form, the shaped body could be used directly as a catalyst in an organic conversion reaction.

As a further alternative, after crystallization and partial drying, the product mixture can be removed from the reactor and mixed with the additional particulate material, such as a binder or matrix material, in a separate mixer before being extruded into a shaped catalyst body.

The invention will now be more particularly described with reference to the following non-limiting Examples and the accompanying drawings.

In the Examples, the XRD diffraction patterns of the as-synthesized materials were recorded on a Bruker D4 X-Ray Powder Diffractometer using copper Kα radiation in the 2θ range of 2 to 40 degrees.

The SEM images were obtained on a HITACHI S4800 Field Emission Scanning Electron Microscope (SEM).

The BET surface area was measured by Micromeritics TriStar 3000 V6.05A (Micromeritics Corporation, Norcross, Ga.) with sample pretreated at 350° C. in air.

Figure 2:
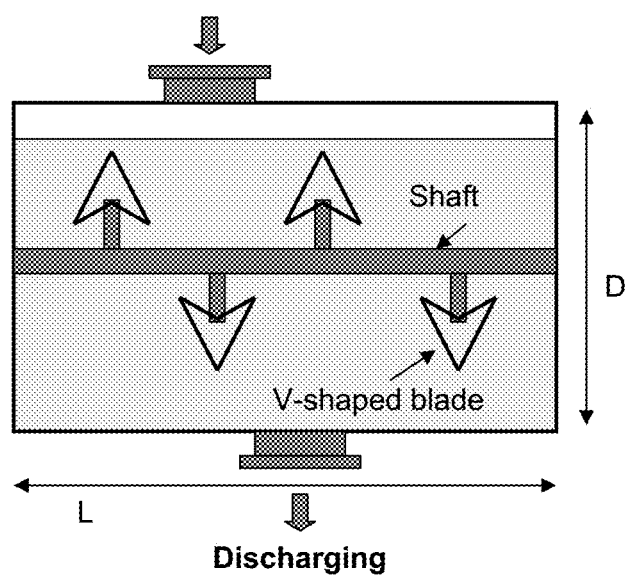

The reactor employed in the Examples is depicted in FIGS. 1 and 2 and comprises a 5 gallon commercial pilot-scale horizontal plough shear mixer/dryer, M/DVT-22 Lab Mixer available from Littleford, Day, Inc. of Florence, Ky., USA. The reactor comprises a horizontal cylinder having a length of about 10 inch (25.4 cm) and a diameter of about 12 inch (30 cm). The reactor has a top mounted charge opening and a bottom mounted discharge opening, both of which can be sealed during operation of the reactor. Mounted within the reactor is a horizontally disposed rotatable shaft which, as shown in FIG. 2, supports four internal heat-transfer plough blades. Each plough blade is V-shaped so that, as it rotates, it splits the reaction mixture into separate streams and lifts and rolls the split streams on either side of the blade, resulting in efficient mixing of even high viscosity slurries. The vessel is jacketed and can be sealed, pressurized, and heated with hot water or steam. The vessel can be equipped with a condenser to remove and condense off-gas from the vessel that is produced during the drying process.

Example 1

A reaction mixture with about 20 wt % solids was prepared from 10480 g of deionized water, 370 g of 50 wt % NaOH aqueous solution, 611 g of 45 wt % sodium aluminate solution, 365 g of n-propyl amine 100% solution, 30 g of ZSM-5 seed crystals and 3082 g of Sipernat silica (a precipitated silica powder from Evonik Degussa). The components of the mixture were charged directly into the mixer/dryer shown in FIG. 1 and mixed with the mixer rotating at 220 rpm for about 20 minutes. The resultant mixture had an apparent viscosity greater than $10^6$ MPa×sec and the following molar composition:

$SiO_2/Al_2O_3$~30

$H_2O/SiO_2$~13

$OH^-/SiO_2$~0.18

$Na/SiO_2$~0.18 n-PA/Si~0.13

Figure 3:
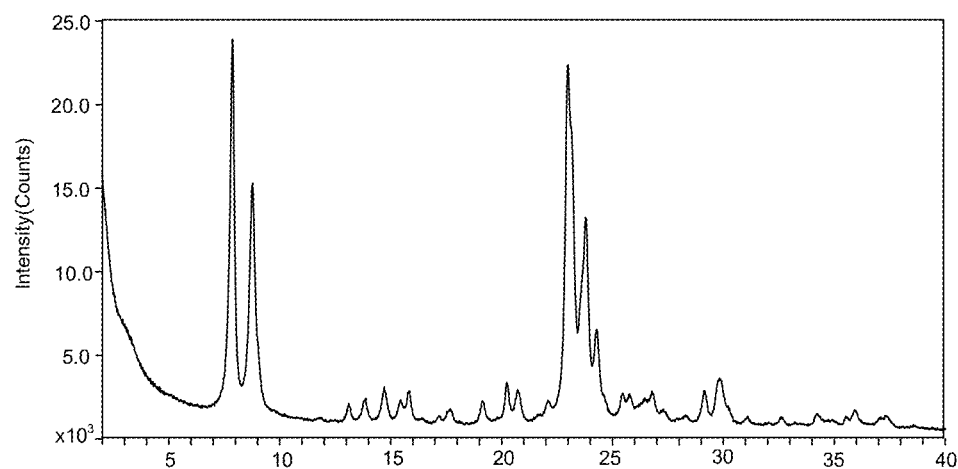
FIG. 3 is an X-ray diffraction (XRD) pattern of the as-synthesized ZSM-5 material from Example 1.
Figure 4:
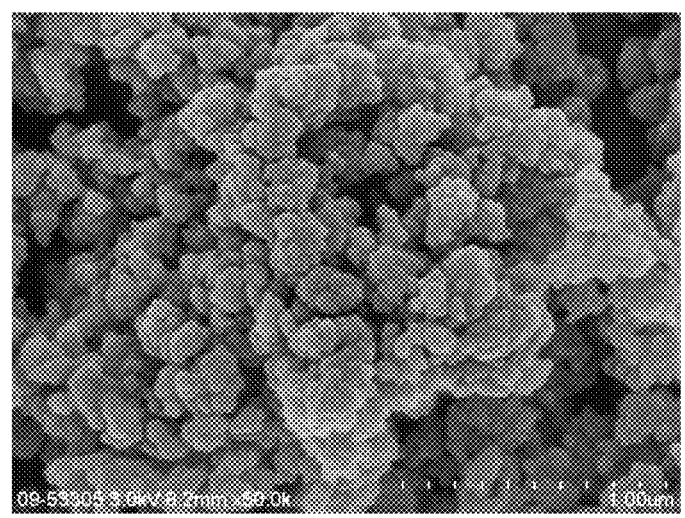
FIG. 4 is a scanning electron micrograph (SEM) of the as-synthesized ZSM-5 material of Example 1.

The mixture was then reacted at 280° F. (138° C.) with stirring at 220 rpm for 24 hours. The resulting reaction slurry was discharged and stored in a five gallon container. The XRD pattern of the as-synthesized material (FIG. 3) showed the typical pure phase of ZSM-5 topology. The SEM of the as-synthesized material (FIG. 4) shows that the material was composed of agglomerates of small crystals of about 0.05 micron in diameter. The $Si/Al_2$ ratio of the resultant crystals was about 24.5/1. The crystals were washed, dried, and then calcined in air at 1000° F. (540° C.) for four hours and then converted into the hydrogen form by ion-exchanging with ammonium nitrate solution at room temperature, followed by drying at 250° F. (120° C.) and calcination at 1000° F. (540° C.) for four hours. The resulting product had an alpha value of about 1500, surface area of 435 $m^2/g$ [360 mg/g (micro pore surface area)+75 mg/g (external surface area)], and 2,2-DMB sorbate diffusivity $D/r^2$=39000.

Example 2

A reaction mixture with about 25 wt % solids was prepared from 9415 g of deionized water, 463 g of 50 wt % NaOH aqueous solution, 764 g of 45 wt % sodium aluminate solution, 456 g of n-propyl amine 100% solution, 30 g of ZSM-5 seed crystals, and 3852 g of Sipernat silica (a precipitated silica powder from Evonik Degussa). The components of the mixture were charged directly into the reactor used in Example 1 and mixed with the mixer rotating at 220 rpm for 20 minutes. The resultant mixture had an apparent viscosity greater than $10^6$ MPa×sec and the following molar composition:

$SiO_2/Al_2O_3$~30

$H_2O/SiO_2$~13

$OH^-/SiO_2$~0.18

$Na/SiO_2$~0.18 n-PA/Si~0.13

Figure 5:
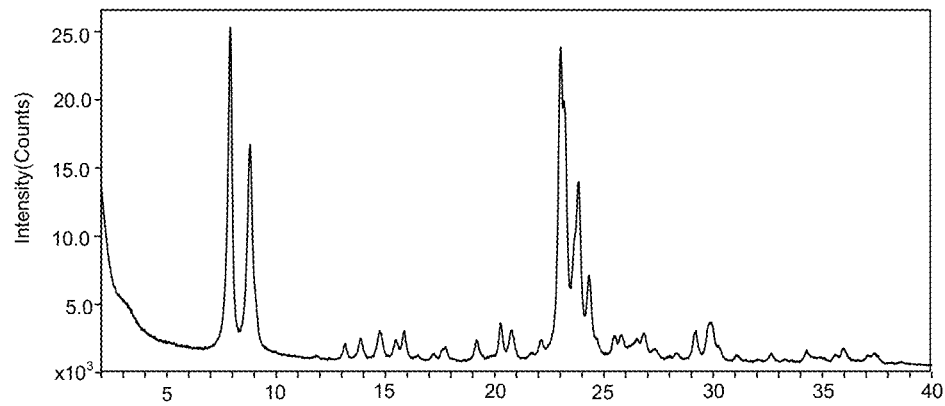
FIG. 5 is an X-ray diffraction (XRD) pattern of the as-synthesized ZSM-5 material from Example 2.
Figure 6:
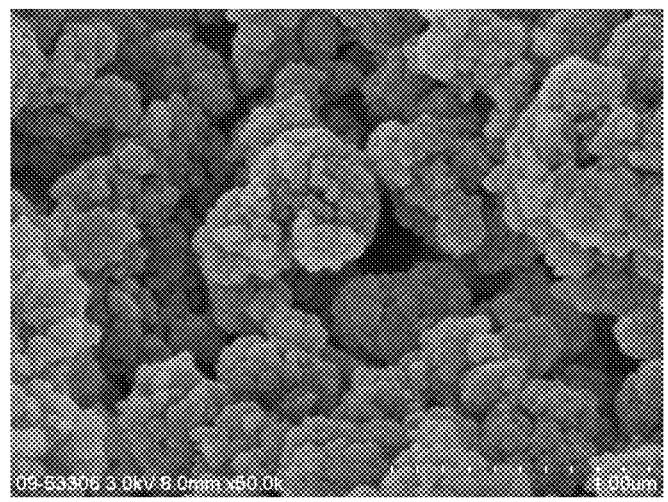
FIG. 6 is a scanning electron micrograph (SEM) of the as-synthesized ZSM-5 material of Example 2.

The mixture was then reacted at 310° F. (154° C.) with stirring at 220 rpm for 24 hours. The resulting reaction slurry was discharged and stored in a five gallon container. The XRD pattern of the as-synthesized material (FIG. 5) showed the typical pure phase of ZSM-5 topology. The SEM of the as-synthesized material (FIG. 6) shows that the material was composed of agglomerates of small crystals of about 0.05 micron in diameter. The $Si/Al_2$ ratio of the resultant crystals was about 24.7/1. The crystals were washed, dried, and then calcined in air at 1000° F. (540° C.) for four hours and then converted into the hydrogen form by ion-exchanging with ammonium nitrate solution at room temperature, followed by drying at 250° F. (120° C.) and calcination at 1000° F. (540° C.) for four hours. The resulting product had an alpha value of about 1700, a surface area of 443 $m^2/g$ [381 mg/g (micro pore surface area)+62 mg/g (external surface area)], and 2,2-DMB sorbate diffusivity $D/r^2$=29200.

The results of Examples 1 and 2 show that good quality ZSM-5 crystals with desirable properties can be successfully produced through a high solids synthesis route at high reaction pressure in a commercial pilot-scale horizontal ploughshear mixer/dryer. The horizontal ploughshare mixer/dryer provided significant advantages over a conventional vertical, stirred reactor for meeting process demands including viscous mixing, reaction, uniform heat-up, and discharging application.

Example 3

A mixture with about 24 wt % solids was prepared from 3954 g of tetraethylammonium hydroxide (TEAOH), as a 35 wt % solution supplied by Aldrich, 15 g of a diluted antifoam solution prepared from Dow Corning 62 antifoament solution, 6978 g of a $C_{12}$ surfactant solution supplied by Akzo Nobel as ARQUAD 12/37, and 3650 g of Sipernat silica supplied by Evonik Degussa. The components of the mixture were charged directly into the reactor used in Example 1 and mixed with the mixer rotating at 110 rpm for 20 minutes. The resultant mixture had an apparent viscosity greater than $10^6$ MPa×sec and the following molar composition:

$SiO_2/Al_2O_3 > 800/1$ $H_2O/SiO_2 \sim 7.2$

TEAOH/Surfactant~1

$SiO_2$/Surfactant~5.8.

Figure 7:
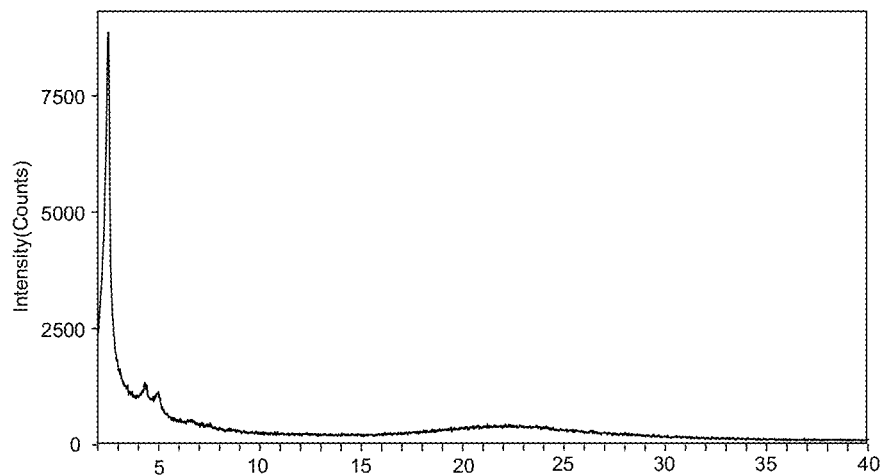
FIG. 7 is an X-ray diffraction (XRD) pattern of the as-synthesized Si-MCM-41 material from Example 3.

The mixture was then reacted at 240° F. (116° C.) with agitation at 20 rpm for 24 hours. The resulting high viscosity product slurry was then discharged from the reactor and stored in a five gallon container. The XRD pattern of the as-synthesized product (FIG. 7) showed the typical pure phase of MCM-41 topology. The SEM of the as-synthesized product showed that the material was composed of agglomerates of small crystals. The calcined washed product showed a surface area of about 1050 $m^2/g$.

Example 4

The process of Example 4 was repeated but, after reaction at 240° F. (116° C.) for 24 hours, the product slurry was removed from the reactor and heated in a separate oven at 250° F. (121° C.) to remove greater than 10 wt % of water providing a solids of greater than 30 wt % for extrusion. The resultant partially-dried product was then used to produce a 80/20 (wt %) MCM-41/alumina catalyst by adding the product and Versal 300 alumina (available from UOP) to a separate muller, mixing the alumina with the partially-dried product in the muller and then feeding to mixture to an extruder. The mixture was formed in the extruder into one-sixteenth inch (1.6 mm) cylindrical extrudates, which were then dried at 250° F. (121° C.) and subsequently calcined in air at 1000° F. (538° C.) for four hours. The final catalyst showed a high surface area of about 830 $m^2/g$ and Na content of about 0.38 wt %. Portions of the extrudate were precalcined at about 800° F. (427° C.) in nitrogen, washed with water, and then completed with final calcination in air at 1000° F. (538° C.) for four hours. The resulting product had a sodium content of about 0.22 wt %.

Example 5

A mixture with about 27 wt % solids was prepared from 3203 g of tetraethylammonium hydroxide (TEAOH) 35% solution, 405 g of sodium aluminate 45% solution, 15 g of a diluted antifoam solution prepared from Dow Corning 62 antifoamant solution, 5651 g of ARQUAD 12/37 solution, and 3677 g of Sipernat silica. The components of the mixture were charged directly into the reactor used in Example 1 through the top mount opening and mixed with the mixer rotating at 110 rpm for 20 minutes. The mixture had the following molar composition:

$SiO_2/Al_2O_3 \sim 50/1$ $H_2O/SiO_2 \sim 7.2$

TEAOH/Surfactant~1

$SiO_2$/Surfactant~5.8.

Figure 8:
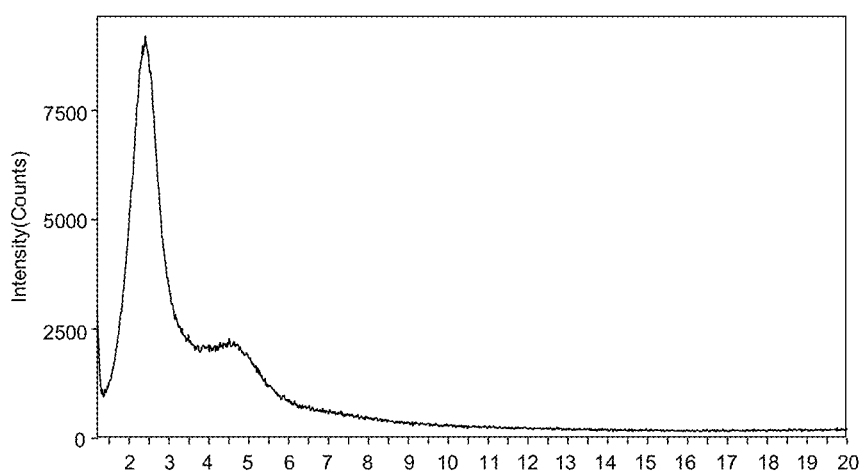
FIG. 8 is a scanning electron micrograph (SEM) of the as-synthesized Al-MCM-41 material of Example 6.

The reactor was sealed and mixture reacted at 240° F. (116° C.) with agitation at 20 rpm for 24 hours. One gallon of the resulting high viscosity slurry product was then discharged and stored in a 5-gallon pail container for later use. The charge valve was then opened to allow water to escape from the reactor to reduce the water content of the slurry and produce a partially dried product with a solids content of 33.2%. The XRD pattern, see FIG. 8, of the as-synthesized material showed the typical pure phase of MCM-41 topology. The SEM of the as-synthesized material showed that the material was composed of agglomerates of small crystals. The calcined washed product had a surface area of about 950 $m^2/g$.

The results of Examples 3 and 5 show that good quality MCM-41 crystals with high desired properties including high surface area can be successfully produced through a high solids synthesis route at high reaction pressure in a commercial pilot-scale horizontal ploughshear mixer/dryer. The horizontal ploughshare mixer/dryer provided significant advantages over a conventional vertical, stirred reactor for meeting process demands including viscous mixing, reaction, uniform heat-up, and discharging application. The reactor comprising horizontal mixer equipped with heat-transfer V-shaped plow blades and double mechanical seals effectively handled mixing and agitation of high viscosity reaction mixtures of MCM-41 crystallizations at high pressures and temperatures.

Example 6

Samples of the partially dried product from Example 5 were mixed in a separate muller with different amounts of Versal 300 alumina to produce mixtures containing MCM-41/alumina ratios of 95/5 (sample A), 90/10 (sample B), and 80/20 (sample C). The resulting mixtures were then formed into $\frac{1}{16}$" cylindrical extrudates and dried at 250° F. (120° C.) before use. The dried extrudates were then calcined in air at 1000° F. (540° C.) for 4 hrs. The final catalyst showed a high surface area of ~620 $m^2/g$ and Na content of ~1 wt %. The calcined extrudates were then converted into the hydrogen form by ion exchange with ammonium nitrate solution at room temperature and 60° C., followed by drying at 250° F. (120° C.) and calcination at 1000° F. (540° C.) for 6 hours. The resulting treated extrudates showed very low Na levels as set out below below.

Sample A (95/5): SA=620 m2/g; Na~0.18% (vs 1.06% before exchange)

Sample B (90/10): SA=620 m2/g; Na~0.15% (vs. 1.02% before exchange)

Sample C (80/20): SA=625 m2/g; Na~0.13% (vs. 0.91% before exchange).

The above data demonstrated that the Na level of the catalyst can be lowered by ion-exchange from the calcined product.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A process for producing a molecular sieve material, said process comprising the steps of:
    (a) mixing water, at least one source of an oxide of a tetravalent element, and optionally a trivalent element, and at least one structure directing agent in a plough shear mixer/dryer/reactor equipped with a mixer having a Froude number of at least 1, to produce a molecular sieve synthesis mixture having a solids content of at least 20 wt %, (b) heating said molecular sieve synthesis mixture in said reactor while agitating said mixture with said plough shear mixer/dryer/reactor to form crystals of said molecular sieve material; and then (c) recovering said molecular sieve crystals from the reactor.

2. The process of claim 1 and further comprising the step of:

(d) prior to step (c), removing water from said molecular sieve synthesis mixture in said plough shear mixer/dryer/reactor while agitating said molecular sieve synthesis mixture with said plough shear mixer/dryer/reactor so as to decrease the water content of said molecular sieve synthesis mixture inside said plough shear mixer/dryer/reactor by at least 5 wt % and produce a partially dried mixture.

3. The process of claim 2, wherein said removing step (d) is conducted after formation of said crystals of said molecular sieve material.

4. The process of claim 3 and further comprising the step of:

(e) mixing said partially dried mixture comprising said crystals of said molecular sieve material with an additional particulate material to produce a product mixture.

5. The process of claim 4, wherein said additional particulate material is a catalyst formulation component.

6. The process of claim 5, wherein said catalyst formulation component is a binder or matrix material.

7. The process of claim 4, wherein said mixing step (e) is conducted in said plough shear mixer/dryer/reactor.

8. The process of claim 4, wherein said mixing step (e) is conducted in a mixer separate from said plough shear mixer/dryer/reactor.

9. The process of claim 4 and further comprising the step of:

(f) extruding said recovered product mixture into a shaped body.

10. The process of claim 2, wherein said removing step (d) is conducted by applying heat to said molecular sieve synthesis mixture.

11. The process of claim 2, wherein said removing step (d) is conducted by reducing the pressure in said plough shear mixer/dryer/reactor.

12. The process of claim 1 and further comprising the step of:

(d) calcining said molecular sieve crystals without subjecting said recovered molecular sieve crystals to an initial filtration and/or washing step.

13. The process of claim 1, wherein said plough shear mixer/dryer/reactor has a capacity of at least 5 liters.

14. The process of claim 1, wherein said plough shear mixer/dryer/reactor comprises at least one blade located on a shaft rotatable about an axis oriented at no more than 10 degrees from horizontal.

15. The process of claim 1, wherein said molecular sieve material comprises ZSM-5 or MCM-41.

* * * * *